UNITED STATES PATENT OFFICE.

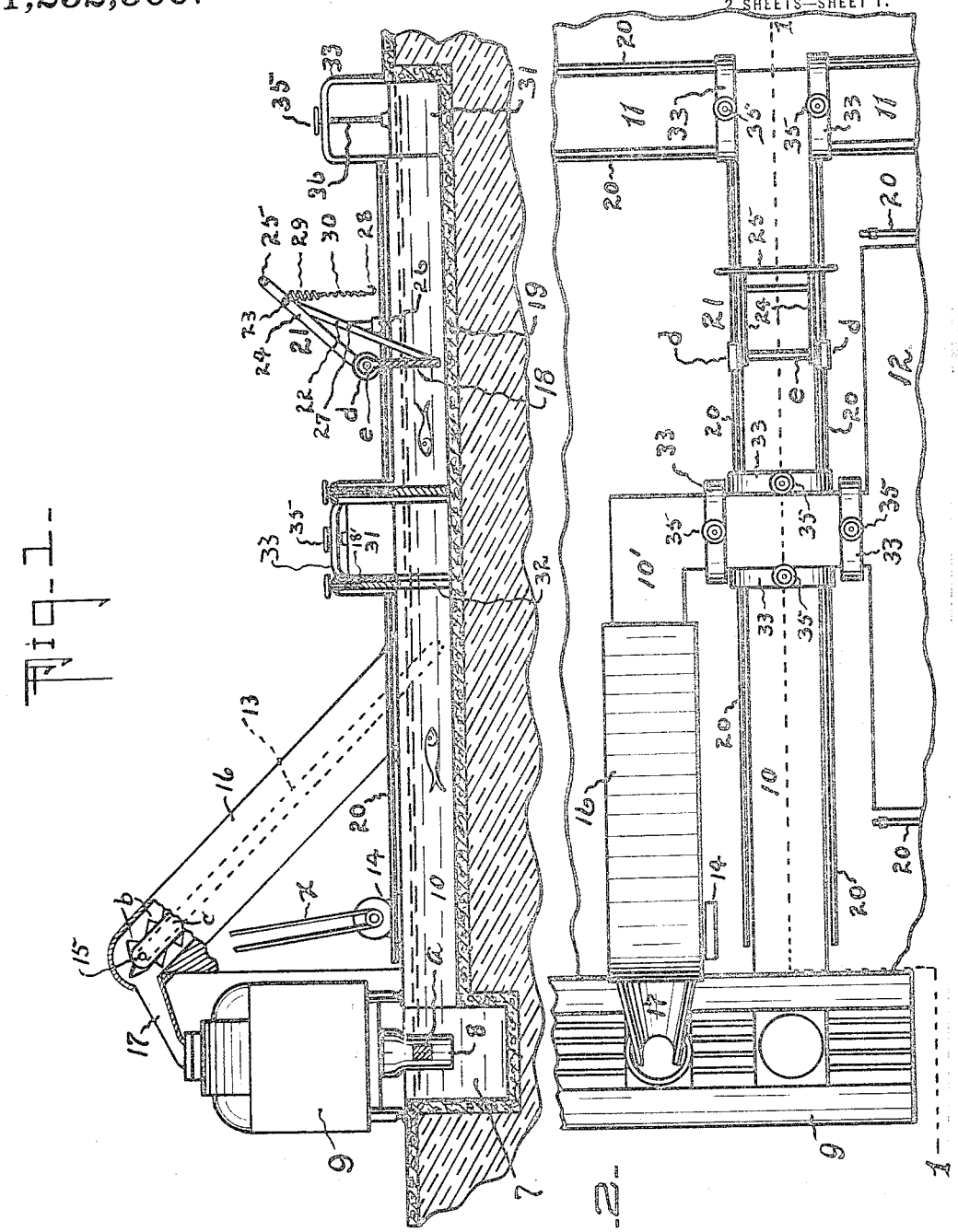

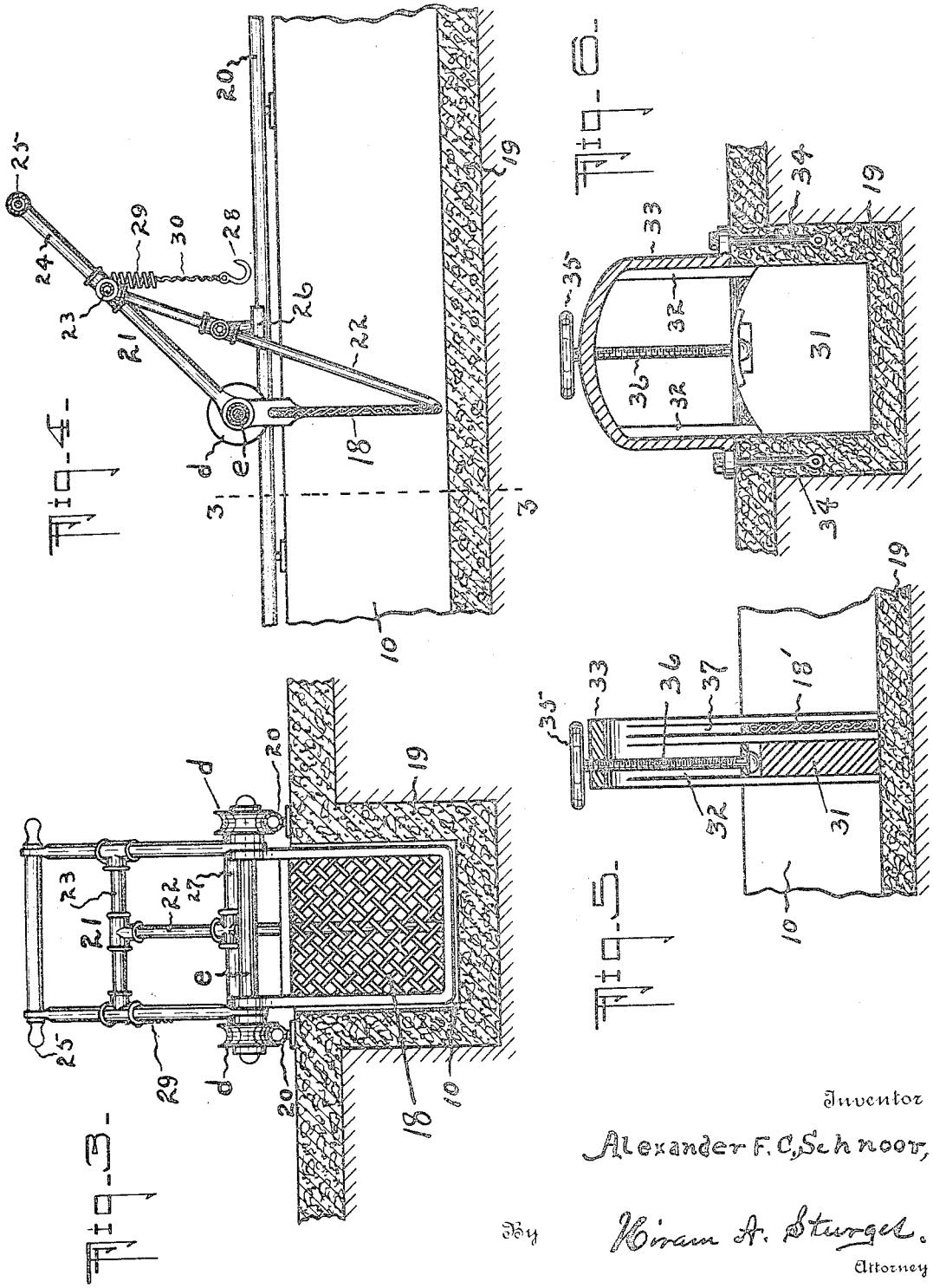

ALEXANDER F. C. SCHNOOR, OF OMAHA, NEBRASKA.

FISH DRIVING, LOADING, AND DELIVERY SYSTEM.

1,252,500.

Specification of Letters Patent.  Patented Jan. 8, 1918.

Application filed March 14, 1917. Serial No. 154,839.

*To all whom it may concern:*

Be it known that I, ALEXANDER F. C. SCHNOOR, a citizen of the United States, residing at Omaha, in the county of Douglas and State of Nebraska, have invented certain new and useful Improvements in Fish Driving, Loading, and Delivery Systems, of which the following is a specification.

This invention relates to a combined fish-driving, loading and delivery means for use at receiving and delivery stations, particularly useful in connection with the fish-transportation system described in a co-pending application filed in U. S. Patent Office by this applicant, Feb'y 12, 1917, Ser. No. 148,068, relating to means for transporting live fish to remote points.

The present invention has reference to means for a control of the movements of fish which have been stored or kept in live condition in tanks, vats or channels ready for a local market or for being forwarded to another station, to the use of locks or gates for separation of the channels, and to means for receiving the fish, the control of movements being such that all of the fish, or any proportion of them may be conveniently driven from the stationary tanks, vats, reservoirs or channels and readily removed to a carrier without being exposed to the air or manual handling and without injury.

In the drawing, which illustrates one embodiment of the invention, Figure 1 is a view showing channels or passageways for containing a water supply and the live fish, and devices for controlling the movements of the fish for purposes of loading them upon tank-cars or other carriers, being a section on line 1—1 of Fig. 2. Fig. 2 is a plan view showing the channels and vats for temporary storage of and devices for loading live fish.

Fig. 3 is an enlarged detail showing a movable weir or perforate gate, the track and walls of the channel being in section on line 3—3 of Fig. 4. Fig. 4 is a side view of the movable weir or gate for driving the fish. Fig. 5 is a transverse section through one of the perforate partitions and dams. Fig. 6 is a side view, in section, of a dam and its operating frame.

In order that live fish may be transported in cars or other carriers for use as food, as described in the co-pending patent application above referred to, means are required at each receiving and delivery station for loading, unloading and temporary storage of the fish, and, as best shown in Fig. 1 of the drawing, each station is provided with a well 7 having a chute 8 projecting above the water therein, the chute being supported in the well by any suitable means, as by the frame $a$, the chute being used when live fish and water are delivered to the well, from the carrier or car 9.

Communicating with the well is a channel 10, and at 11 are indicated channels disposed transverse and communicating with the channel 10, and at 12 is indicated a reservoir or vat; and any desired number of channels and vats or reservoirs, of suitable depth and width may be employed each to contain water, either salt or fresh, depending upon the kinds of fish to be stored therein or to be transported.

At 13 is indicated an endless carrier provided with pockets $b$ and mounted in the side plates $c$ and actuated by any suitable power, as the motor 14 provided with a movable belt $x$ for actuating the shaft 15, the carrier and side plates being disposed within a frame or housing 16 extending inclinedly from the water of one of the channels to a point above the car, its upper end being provided with a downwardly inclined chute 17 for communicating with the car, and when driven within the channel 10', the fish will be carried upwardly, together with a quantity of water, upon entering the pockets, the delivery being effected without manual handling or injury to the fish, and without removing them from the water.

In order that the movements of the fish may be under control, during the operation of driving them from the reservoirs, vats or channels 10 to the channel 10', certain perforated, vertical slide-partitions or screens 18' are employed at the intersections of the channels 10 and 11, and for driving the fish from the channels 10 or reservoirs 12 to the channel 10', a weir or perforate gate 18 is employed which has a length and width corresponding substantially to the depth and width of the channels in cross-section, and is adapted to be moved horizontally therein for a control of said passageways or channels at said intersections.

The channels are preferably of rectangular form in cross-section, the bottom and sides thereof consisting of concrete or similar adhesive material 19 which will be imporous when hardened to prevent leakage of water, said material being disposed as a layer upon the ground. Numerals 20 indicate parallel tracks or rails upon which the wheels *d* of a push-car or vehicle 21 may move, the axle *e* providing bearings for the U-shaped frame of the gate, means being provided to maintain the gate in a vertical position, consisting, in part, of a brace 22 having its lower end secured at the medial line of the gate upon the bottom of the U-shaped frame, its upper end being secured upon the cross-bar 23, midway between the side bars 24.

The vehicle thus described may be conveniently moved forwardly or rearwardly by use of the handles 25 for moving the fish from the reservoirs or channels into the channel 10' when loading, any pressure upon the gate from its rear, occasioned by a mass or large quantity of moving fish, being resisted by the shoes 26 which engage the track, said shoes being mounted upon the cross-bar 27 of the frame. To resist a pressure on the gate directed from its front, occasioned by moving fish, resiliently mounted catches or hooks 28 are employed, adapted to catch under the track rails, said hooks being supported by the springs 29 and chains 30, said springs being secured upon and midway between the ends of the side bars.

The vehicle may have a width somewhat greater than the width of a channel or reservoir which its axle must span, and the gate or movable weir 18 operates as an expulsion member when moved in the water for driving the fish, without injury, from one channel to another, or to cause them to occupy a limited space, as may be required, the control of their movements being such that they may be removed for use as food at a local market or may be transported to other stations.

Means are provided to close the channels so that the water may be removed for the purpose of removing refuse, or for making repairs of the walls, if leakage occurs, said means consisting of the imperforate slidegates or dams 31, each being slidably mounted in the vertical grooves 32 of a frame 33 of substantially inverted U-shape, said frames preferably being secured to the walls 19 by suitable anchor-bolts 34; and by use of wheels 35 of the screw-members 36 said members 31 may be lowered and pressed downwardly to prevent a passage of any water from one channel to another, for the purposes mentioned.

During operation, the imperforate slidegates 31 remain open except when repairs are necessary or when it is required to clean the channels or reservoirs. The perforate barriers, gates or screens 18' are slidably mounted in grooves 37 of the frames 33, as best shown in Fig. 5, and may be moved downwardly whenever required to obstruct a channel and confine the fish within certain limits, this being necessary when removing all of the fish, and as is obvious, the fish may be driven out of any one or more of the channels.

It is believed that the advantages afforded by the invention will be appreciated by consumers of sea fish, or fish from fresh waters, since the fish may be stored and kept in live condition ready for use at local markets, and will be appreciated by those engaged in the sale and distribution of live fish since a convenient control and delivery of the fish for transportation is provided.

Having fully described my invention, what I claim and desire to secure by Letters Patent is,—

1. In a system for the purpose described, a channel open at its top for containing water and live fish, an endless carrier in the channel for delivering the fish therefrom, a vehicle supported outwardly of the sides and having an axle spanning the channel, a perforate gate in the channel and carried by said axle, said vehicle and gate being movable longitudinally of the channel for driving the fish in the direction of the carrier.

2. In a system for the purpose described, a well provided with water and having a chute for receiving live fish, a water-supplied channel in communication with the well, a track adjacent to the channel, an axle spanning the channel and provided with roller members for engaging the track, an endless carrier in the channel for delivering the fish therefrom, and a perforate gate supported by the axle and movable in the channel for driving the fish in a direction of the carrier.

3. In a system for the purpose described, a channel open at its top for containing water and live fish, a perforated barrier, an imperforate barrier, said barriers being disposed transversely of and movable vertically in the channel, an endless carrier in the channel for delivering the fish therefrom, a vehicle having upwardly projecting sidebars, said vehicle being supported outwardly of the sides and spanning the channel, a perforate gate disposed in the channel and connected with the vehicle, devices connected with the gate and side-bars for maintaining the gate in an upright position, said vehicle and gate being movable longitudinally of the channel for driving the fish in the direction of the carrier.

4. In a system for the purpose described, the combination with a plurality of intersecting channels each being open at its top and provided with water for containing fish, a conveyer communicating with one of the channels for conducting the fish therefrom, means for driving the fish in the channel toward the conveyer including a vehicle disposed above and provided with wheels supported outwardly of the sides of a channel for a movement longitudinally thereof, a perforate gate carried by the vehicle and disposed in a channel, and a plurality of secondary gates movable vertically, at the will of an operator, for obstructing the channels at the intersections thereof.

5. In a system for the purpose described, a water-supplied channel, a chute communicating with the channel for receiving live fish, a conveyer communicating with the channel for conducting the fish therefrom, a track adjacent to the channel, an axle spanning the channel and provided with wheels engaging the track, and a perforate element carried by the axle, movable longitudinally of the channel for driving the fish toward the conveyer.

6. In a system for the purpose described, the combination with a plurality of intersecting channels each being open at its top and adapted to contain water and live fish, a conveyer communicating with one of the channels for conducting the fish therefrom, a vehicle disposed above and having wheels supported at the top outwardly of the sides of a channel, a perforate gate disposed in a channel and carried by the vehicle, said vehicle being movable longitudinally of a channel to cause the fish to be driven toward the conveyer, and vertically movable members for closing the channels at their intersections at the will of an operator.

7. In a system for the purpose described, a water-container for receiving live fish, a water-supplied channel open at its top and formed substantially rectangular in cross-section in communication with the container, a carrier in the channel for removing the fish therefrom, a vehicle disposed above and supported outwardly of the open top of the channel, an upright perforate gate in the channel, said gate being substantially rectangular in side elevation and carried by the vehicle, said vehicle being movable longitudinally of the channel for causing the fish to move toward the carrier.

8. In a system for the purposes described, a water-container for receiving live fish, a water-supplied channel substantially rectangular in cross-section in communication with the container, track rails parallel with the channel, roller-members on the track rails, a carrier in the channel for removing the fish therefrom, and an upright, perforate gate supported by the roller-members, said gate being substantially rectangular in side elevation and disposed within and being movable horizontally in the channel for driving the fish toward the carrier.

9. In a system for the purpose described, a water-container for receiving live fish, a plurality of water-supplied, intersecting channels in communication with the container, each channel being open at its top, a carrier in the channel for removing the fish therefrom, a vehicle disposed above and having roller members disposed outwardly of the sides of a channel, an upright perforate gate in a channel and carried by the vehicle, said vehicle being movable longitudinally of the channel for causing a movement of the fish toward the carrier, and a plurality of vertically movable members in the channels adjacent to said intersections for obstructing said channels.

10. In a system for the purpose described, a water-supplied channel for containing live fish, a track adjacent to and substantially parallel with the channel, a vehicle movable on the track, a perforate gate carried by the vehicle and disposed within and transversely of the channel for driving the fish, means on the vehicle for engagement with the track to resist stresses directed to and transversely of the gate, and an actuated carrier for removing the fish from the channel, said gate having a form in side elevation conforming substantially to the form of the channel in cross-section.

In testimony whereof, I have affixed my signature in presence of two witnesses.

ALEXANDER F. C. SCHNOOR.

Witnesses:
HIRAM A. STURGES,
ARTHUR H. STURGES.